United States Patent [19]

Shekleton

[11] Patent Number: 4,825,640
[45] Date of Patent: May 2, 1989

[54] COMBUSTOR WITH ENHANCED TURBINE NOZZLE COOLING

[75] Inventor: Jack R. Shekleton, San Diego, Calif.

[73] Assignee: Sundstrand Corporation, Rockford, Ill.

[21] Appl. No.: 74,279

[22] Filed: Jul. 16, 1987

Related U.S. Application Data

[63] Continuation-in-part of Ser. No. 65,258, Jun. 22, 1987, Pat. No. 4,794,754.

[51] Int. Cl.[4] .............................. F02C 3/14; F02C 7/12
[52] U.S. Cl. .................................... 60/39.36; 60/752; 60/760
[58] Field of Search ....................... 60/39.36, 755, 757, 60/759, 760, 39.75, 34.83, 752

[56] References Cited

U.S. PATENT DOCUMENTS

| | | | |
|---|---|---|---|
| 2,592,748 | 4/1952 | Sedille | 60/39.36 |
| 2,704,440 | 3/1955 | Nicholson | 60/752 |
| 3,548,565 | 12/1970 | Toesco | 60/39.36 |
| 3,608,310 | 9/1971 | Vaught | 60/752 |
| 3,613,360 | 10/1971 | Howes | 60/39.36 |
| 3,937,013 | 2/1976 | Aspinwall | 60/39.36 |
| 4,157,232 | 6/1979 | Bobo et al. | |
| 4,296,599 | 10/1981 | Adamson | |
| 4,318,666 | 3/1982 | Pask | |
| 4,353,679 | 10/1982 | Hauser | |
| 4,426,226 | 7/1985 | Hsia et al. | |
| 4,522,557 | 6/1985 | Bouiller et al. | |
| 4,527,385 | 7/1985 | Jumelle et al. | |
| 4,551,064 | 11/1985 | Pask | |
| 4,553,901 | 11/1985 | Laurello | |
| 4,733,538 | 3/1988 | Vdoviak et al. | 60/39.75 |

Primary Examiner—Louis J. Casaregola
Attorney, Agent, or Firm—Wood, Dalton, Phillips Mason & Rowe

[57] ABSTRACT

The expense of fabricating an annular combustor for use with a small diameter gas turbine engine is minimized in a construction including a bell-shaped housing 52, an axially extending sleeve 66 within the housing 52, an annular liner 74 within the housing 52 and about the sleeve 66 and including inner, outer and radial walls 80, 76, 78, respectively, spaced from the sleeve 66 and the housing 52 and all being formed of sheet metal. A circular fuel manifold 108 with angularly spaced fuel dispensing openings 122 is disposed between the housing 52 and the outer wall 76 and a plurality of open ended, elongated tubes 112 extend through the outer wall 76 and are in fluid communication with respective openings 122 in the fuel manifold 108 to introduce air and fuel generally tangentially into the liner 74. An end 68 of the sleeve 66 and an end 86 of the outer wall 76 define an outlet in fluid communication with a turbine nozzle structure 46 having turbine nozzle blades 136. The outer wall 76 is provided with a plurality of inwardly directed tabs 130 which extend toward the turbine nozzle structure 46 and which are oriented with respect to the blades 136 such that cooling air entering the space between the inner and outer radial walls 80, 76 through the outer wall 76 at the location of the tabs 130 impinges upon a corresponding one of the turbine nozzle blades 136 to cool the same.

8 Claims, 3 Drawing Sheets

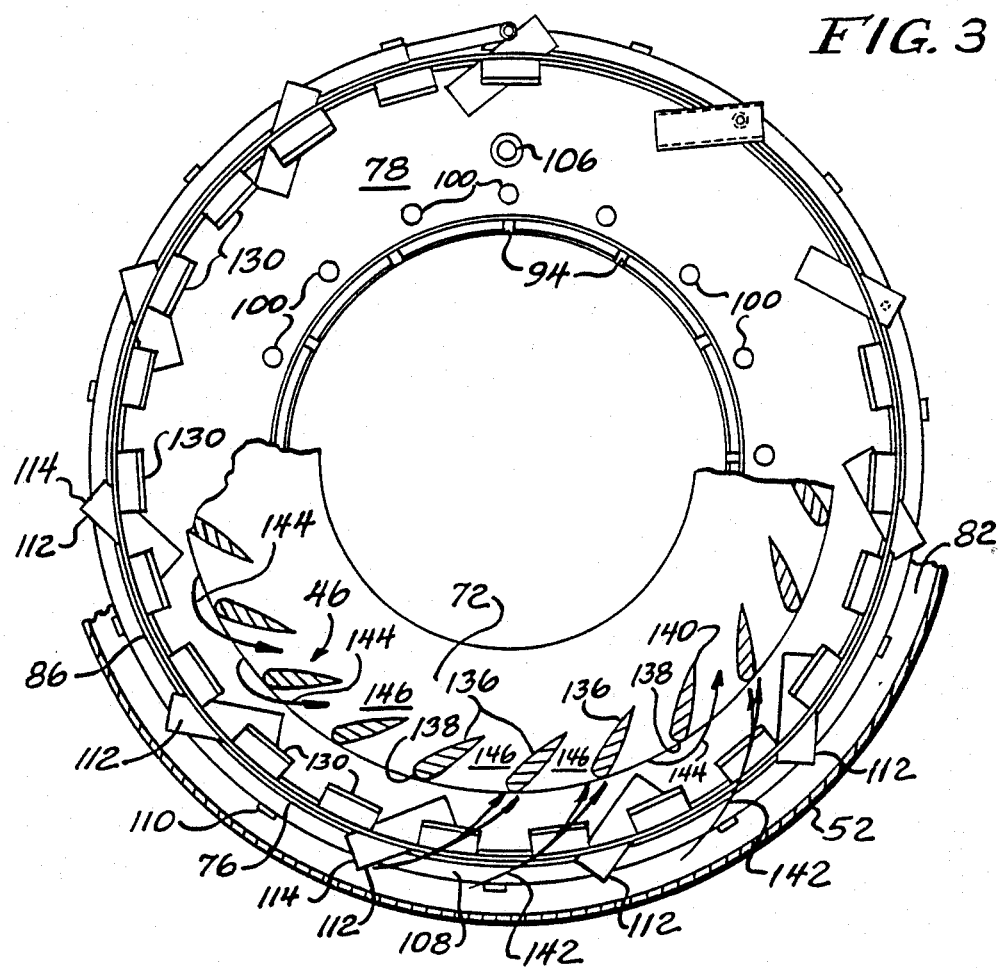
FIG. 3
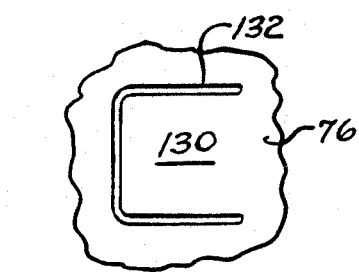
FIG. 4
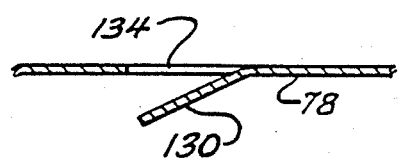
FIG. 5
FIG. 6
FIG. 7

COMBUSTOR WITH ENHANCED TURBINE NOZZLE COOLING

CROSS REFERENCE

This application is a continuation-in-part of my commonly assigned patent application entitled, "Low Cost Annular Combustor" Serial No. 065,258, filed June 22, 1987 (U.S. Pat. No. 4,794,754).

FIELD OF THE INVENTION

This invention relates to combustors for use in gas turbine engines, and more particularly, to enhanced cooling of turbine nozzles in such engines, particularly those fitted with annular combustors.

BACKGROUND OF THE INVENTION

Most relatively small missiles in use today are propelled by solid fuel rockets as opposed to, for example, turbojet engines. The selection of a solid fuel rocket as a propulsion device has been largely dictated by two factors. First, in many instances, a turbine engine cannot be fabricated sufficiently economically as to compete with a solid fuel rocket engine. Secondly, in small size missiles, i.e., those having relatively small diameter on the order of about six inches, it is heretofore been quite difficult to manufacture an efficient turbojet engine that would fit within the six inch envelope required of the propulsion unit for such a missile.

As a consequence of the use of solid fuel rocket engines, some degree of control of the missile flight path or trajectory is lost over that which would be available were it possible to propel the missile by a gas turbine engine whose output can be readily varied. Further, even if the gas turbine engine operates relatively inefficiently, the use of such an engine greatly extends the range of the missile.

The difficulty in economically producing small diameter gas turbine engines resides not so much in the manufacture of the compressor and/or turbine section of the engine, but rather, is more apt to be attributable to the labor intensive nature of the manufacture of the combustor. Furthermore, as combustor sizes shrink to fit within some desired small envelope as the six inch envelope of a relatively small missile mentioned previously, the difficulty in achieving efficient combustion of fuel rises asymptotically. In particular, as the size or volume of a combustor is reduced, there may be insufficient volume to allow the fuel to be first vaporized completely, burned efficiently, and then mixed uniformly.

Even when the difficulties with combustor sizing can be solved, still a further difficulty presents itself, namely, the prevention of the inevitably developed hot spots that occur in such a small combustor from deleteriously affecting the turbine nozzle and shortening its life to the point of premature failure. Assuming a typical turbine inlet temperature of about 1900° F., hot spot temperatures of at least 2100° F. will occur.

When gasses at the hot spot temperatures contact the vanes or blades of the turbine nozzle, overheating occurs which shortens the life of the nozzle and may lead to premature malfunctioning of the turbine engine itself. Consequently, there have been a number of proposals for the cooling of turbine nozzle blades, generally by providing them with internal passages through which cooling air, typically bleed air from the compressor or air by otherwise bypassing a combustor, may flow for cooling purposes. See, for example, the disclosures of U.S. Pat. No. 4,296,599 issued Oct. 27, 1981 to Adamson and U.S. Pat. No. 4,522,557 issued June 11, 1985 to Bouillier.

These approaches to the cooling of the stationary turbine nozzle blades, while effective, are far from being economical and therefore do not lend themselves to use in turbine engines that must be economically manufactured.

The present invention is directed to overcoming one or more of the above problems.

SUMMARY OF THE INVENTION

It is the principal of the invention to provide a new and improved gas turbine engine that may be economically manufactured and/or may be fitted within an unusually small envelope. More specifically, it is an object of the invention to provide a new and improved gas turbine engine including unique means for the cooling of blades in a turbine nozzle to extend their life and thereby allow the use of a greater proportion of combustor volume for combustion (as opposed to mixing of combustion gasses with dilution air), and thereby achieve increased thermal loading.

An exemplary embodiment of the invention achieves the foregoing object in a gas turbine including a housing having an axis surrounded by radially inner and outer walls. An annular liner is disposed within the housing and between the housing walls, has concentric inner and outer, annular axially elongated walls respectively spaced from the inner and outer housing walls along with a radially extending end wall interconnecting the inner and outer walls at one end thereof. Means are provided for introducing fuel to be burned into the liner at a plurality of circumferentially spaced locations and a turbine nozzle structure including a plurality of circumferentially spaced nozzle blades is located at the ends of the inner and outer liner walls and opposite of the radially extending end wall. A plurality of air inlets are located in the liner outer wall in close proximity to the nozzle structure, there being at least one air inlet for each of the blades and oriented with respect to the associated blade to direct air into the liner and at the associated blade to cool the same.

In a preferred embodiment of the invention, the liner is formed of sheet metal and the air inlets are defined by punched holes in the liner outer wall.

In a highly preferred embodiment, the punched holes include inwardly bent tabs directed toward the nozzle structure to act as flow directors.

The invention contemplates that in some instances the air inlets and the associated nozzle blades be angularly offset with respect to each other such that swirling air between the outer liner wall and the outer housing wall and entering the inlets will impinge upon the leading edges of the associated nozzle blades.

Preferably, the number of the plurality of air inlets is an integral multiple of the number of the plurality of blades.

In a highly preferred embodiment, the housing is defined by a bell-shaped element along with an axially extending sleeve. The fuel introducing means may include a circular fuel manifold with angularly spaced fuel dispensing openings disposed between the housing outer wall and the liner outer wall and located in a first plane transverse to the axis of the machine. The fuel dispensing means also includes a plurality of open ended elongated tubes in the outer wall of the liner and located adjacent the manifold. The tubes lie in a second plane parallel to the first plane and are directed generally tangential to the space between the inner and outer liner walls. One end of each tube is located in the space between the inner and outer liner walls and the other end of each tube is located between the housing outer wall and the liner outer wall, and there is one such tube for each fuel dispensing opening. Means are provided to establish fluid communication between each fuel dispensing opening and the interior of its associated tube.

Other objects and advantages will become apparent from the following specification taken in connection with the accompanying drawings.

DESCRIPTION OF THE DRAWINGS

FIG. 3 is an end view of a liner used in the combustor with part of a housing for the liner and part of a turbine nozzle structure shown fragmentarily;

FIG. 4 is an enlarged, fragmentary view of a portion of a fuel manifold and nozzle construction utilized in the invention;

FIG. 5 is a fragmentary, enlarged view of the nozzle and fuel manifold taken from another direction;

FIG. 6 is an enlarged, fragmentary view of a dilution air inlet to the combustor; and FIG. 7 is a sectional view of the dilution air inlet.

DESCRIPTION OF THE PREFERRED EMBODIMENT

Figure 1:
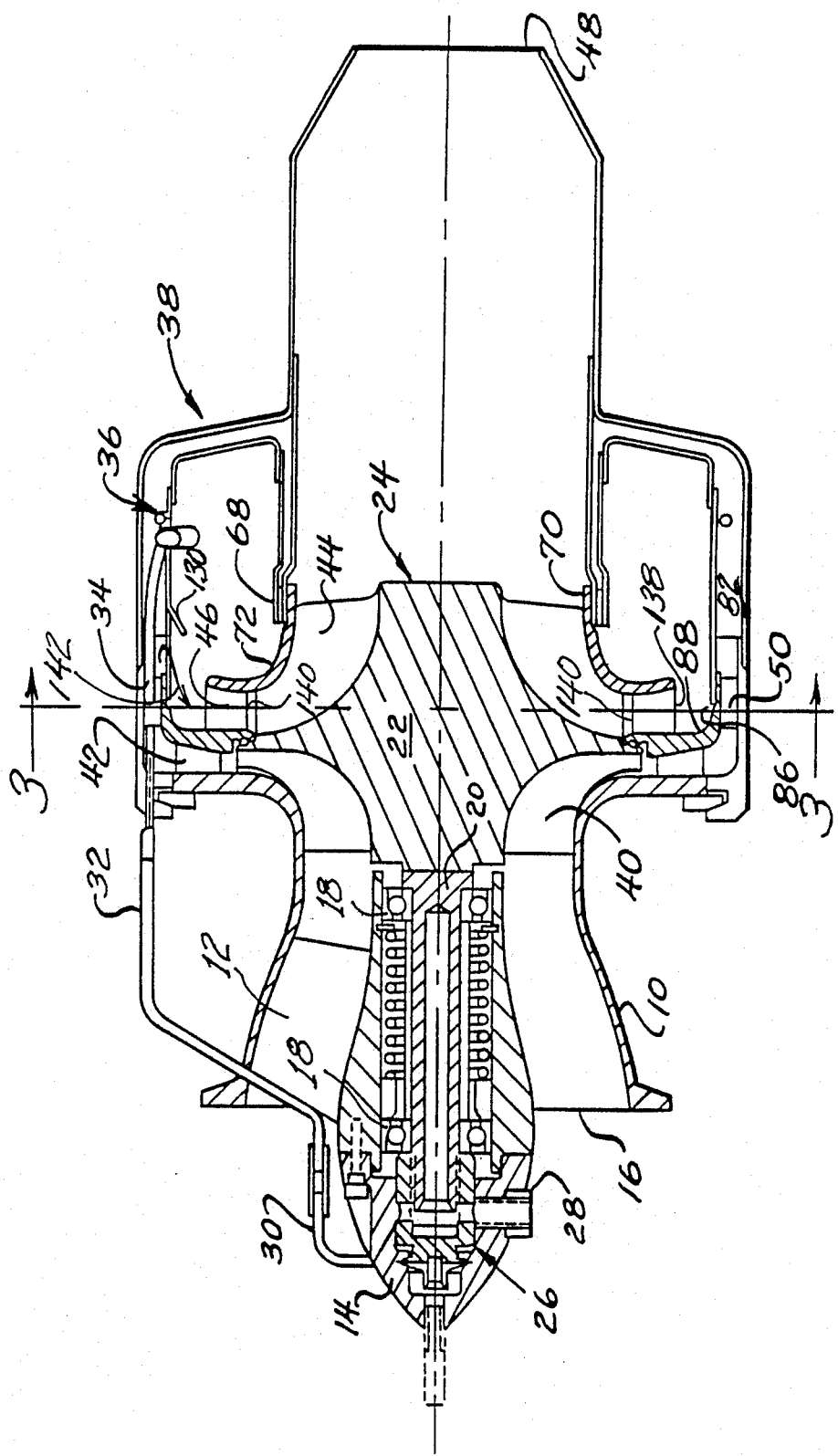
FIG. 1 is a sectional view of a gas turbine engine, specifically a turbojet engine, embodying an annular combustor made according to the invention.

An exemplary embodiment of a combustor made according to the invention is illustrated in a gas turbine engine in FIG. 1. The gas turbine engine is in the form of a turbojet and therefore performs work by the production of thrust. However, those skilled in the art will readily appreciate that the invention is applicable to other forms of gas turbine engines including those wherein the output power is taken from a rotating shaft.

In any event, the gas turbine engine includes an air inlet housing 10. A plurality of angularly spaced, radially inwardly directed struts 12 (only one of which is shown) stationarily mount a suitably aerodynamically configured housing 14 centrally within a circumferential inlet opening 16 on the housing 10. The housing 14 includes bearings 18 which journal a shaft 20 which is coupled to the hub 22 of a so-called monorotor, generally designated 24.

The shaft 20, within the housing 14, may be coupled to a fuel pump 26 of conventional construction having an inlet 28 and an outlet line 30.

The outlet line 30 passes up the leading edge of the strut 12 and then extends axially as shown at 32 to be connected to a section 34 which in turn extends to a fuel manifold, generally designated 36, within an annular combustor, generally designated 38, and made according to the invention.

Returning to the rotor 24, on one side thereof, the same is provided with a plurality of compressor vanes 40 in fluid communication with the inlet 16 and which direct compressed air radially through a conventional diffuser 42. After passing through the diffuser, the compressed air is directed axially into an inlet for the combustor 38 as will be described in greater detail hereinafter.

On the side of the hub 22 opposite from the compressor vanes 40, the rotor 24 includes radial flow turbine blades 44. Hot gasses of combustion from the combustor 38 are directed against the blades 44 by a nozzle structure, generally designated 46, to drive the rotor sufficiently as to compress the air necessary for turbine operation as well as to provide power for the fuel pump 26 and any other accessory systems that require it. The hot gasses of combustion then exit the machine via a jet nozzle 48 producing thrust in the process.

In most instances, so-called deswirl vanes 50 are interposed between the diffuser 42 and the inlet to the combustor 38. As is well know, the purpose of such vanes is to reduce the helical component of air flow from the diffuser 42.

Those skilled in the art will also appreciate that in many gas turbines, the geometry of the deswirl vanes corresponding to the vanes 50 may be quite complex in order to minimize the helical component of air flow.

However, according to the present invention, the deswirl vanes 50 may be relatively simple, and thus inexpensive, because unlike conventional art, a high degree of swirl within the combustor 38 is tolerated, and indeed, is advantageous.

As alluded to generally previously, the combustor 38 of the present invention is not only intended to be inexpensive to manufacture, but is additionally intended to be ideally suited for use in environments having a small envelope for the gas turbine and to burn all conceivable fuels. In this regard, in the description that follows, it should be appreciated that th structure is one that has actually been proved and wherein the outside diameter of the engine, including the combustor 38 is but a mere six inches, with an annulus height of about one inch.

Figure 2:
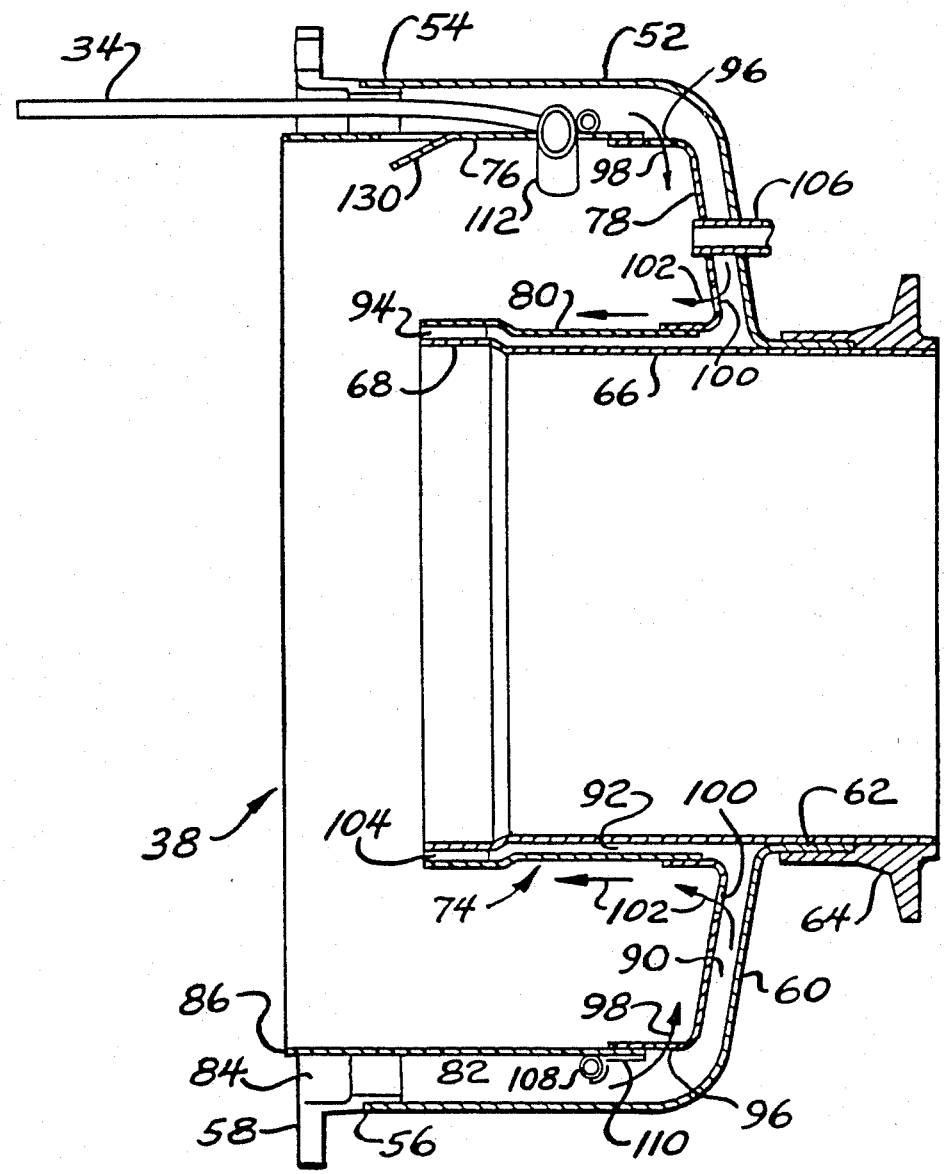
FIG. 2 is a sectional view of the combustor.

As best seen in FIG. 2, the combustor 38 includes a bell-shaped housing 52 having a cylindrical wall 54 terminating in an edge 56 receiving a ring 58 for mounting purposes. The cylindrical surface 54 merges with a generally radially inward directed surface 60 which, in turn merges with a short, small diameter, axially extending cylindrical surface 62 which receives a mounting ring 64 for the jet nozzle 48.

A generally cylindrical sleeve 66 is fitted within the cylindrical section 62 and secured thereto. The sleeve 66 extends substantially toward but not to the mounting ring 58 to terminate in a slightly enlarged end 68 which, as seen in FIG. 1, is adapted to be received on the open end 70 of an annular casting 72 joined with the nozzle structure 46.

Disposed within the bell-shaped housing 52 and in spaced relation to the same as well as the sleeve 66 is a liner, generally designated 74. The liner 74 includes a cylindrical, radially outer wall 76 joined to a generally radially extending end wall 78 which in turn is joined to a radially inner wall 80. As can be discerned from FIG. 2, the walls 76, 78 and 80 are separate pieces which are suitably joined together. In this connection, according to a preferred embodiment of the invention, and to achieve economy of construction, the walls 76, 78 and 80 of the liner 74 as well as the bell-shaped housing 52 and the sleeve 66 are all formed of sheet metal as by stamping or the like.

The disposition of the liner 74 within the bell-shaped housing 52 as mentioned previously results in an axially elongated annular space 82 which terminates adjacent the mounting ring 58 in an annular compressed air inlet opening 84. In this connection, an end 86 of the radially outer wall 76 of the liner 74 is adapted to fit against a stationary casting 88 which is interposed between the diffuser 42 and the nozzle 46 to seal against the same. Thus, compressed air from the diffuser 42, after passing by the deswirling vanes 50, is directed into the annulus 82 between the bell housing 52 and the radially outer wall 76.

A radially elongated annulus 90 in fluid communication with the annulus 82 exists between the radial wall 78 of the liner 74 and the surface 60 of the bell-shaped housing 50. This annulus 90 in turn merges with a very narrow, axially elongated radially inner annulus 92 defined by a space between the sleeve 66 and the radially inner wall 80 of the liner 74. To maintain concentricity between the sleeve 66 and the wall 80, adjacent the end 68, the liner 74 mounts a plurality of spacers 94. The spacers 94 engage, and are secured to the enlarged end 68 of the sleeve 66 and the enlarged end of sleeve 80 allowing relative movement between the components due to thermal forces.

At circumferentially spaced locations about the radially outer wall 76 of the liner and immediately adjacent the radial wall 78, the former is provided with a plurality of punched holes 96. Air flowing in the annulus 82 may enter the holes 96 and sweep as a film along the interior side of the radial wall 78 for cooling purposes. The air flow is indicated by arrows 98. Of course, additional cooling of the radial wall 78 will be accomplished by air flowing in the radial annulus 90.

Near the radially inner periphery of the radial wall 78, the same is provided with a series of punched openings 100 allowing compressed air from the radial annulus 90 to enter the interior of the liner 74 and flow in a film-like fashion along the interior surface of the inner wall 80 as indicated by arrows 102, also for cooling.

Such air that continues flowing in the annulus 90 past the openings 100 will enter the annulus 92. Because of the extremely narrow width of the annulus 92, such air will have to increase its velocity to flow therethrough. The increased velocity will, of course, mean increased Reynolds and Nusselt Numbers which, of course, means enhanced heat transfer at the radially inner wall 80.

The just described structure effectively provides external convective cooling supplemented by rudimentary film cooling to avoid undesirable thermal gradients that reduce life. At the same time the structure allows the maintenance of relatively high liner temperatures which, in conjunction with the cooling air, acts to minimize carbon deposition thereon.

As will be appreciated by those skilled in the art, the means employed to achieve such cooling are inexpensive. The low cost of the structure for such cooling is facilitated by the unique aerothermodynamic design of the combustor to be described in greater detail hereinafter. Tests of the combustor have demonstrated blueflame combustion with the resulting low radiation heat input to the walls of the liner 74 thus making the just described cooling feasible.

After cooling the radially inner wall 80, the air exits an annular opening 104 to thoroughly and effectively mix with combustion gas within the interior of the combustor 74 and act as dilution air.

At one location, an axially directed tube 106 extends through both the housing 52 and the radial wall 70 to the interior of the liner 74. The tube 106 may be fitted with any suitable igniter or pyrotechnic device for the purpose of initiating combustion within the liner 74.

As seen in FIGS. 2 and 3, the fuel manifold is a circular fuel conduit 108 that extends peripherally about the outer wall 76 of the liner 74. A series of brackets 110 secure the conduit 108 in a plane transverse to the axis of the combustor 38.

At a plurality of angularly spaced locations, open ended tubes 112, which serve as nozzles, extend through the outer wall 76 of the liner 74. In the illustrated embodiment, eleven of the tubes 112 are employed. Those skilled in the art will appreciate that greater or lesser numbers could be used as desired.

The tubes each have one open end 114 within the annulus 82 and directed so as to open toward the oncoming flow of air. That is to say, the tubes 112 have their open ends 114 directed so as to allow the swirling air within the annulus 82 to enter the tubes 112 without appreciably changing direction. Though not shown, the ends 114 may be flared to reduce pressure losses at this location.

The opposite open ends 116 of the tubes 12 are disposed within the interior of the liner 74 and it will be appreciated from FIG. 3 that the axes of the tubes 112 are generally tangential to the space between the inner and outer walls 76 and 80 of the liner 74. It will also be appreciated from FIG. 2 that the axes of the tubes 112 lie in a plane transverse to the axis of the combustor 38 and immediately adjacent the plane occupied by the fuel conduit 108.

Turning to FIGS. 4 and 5, each of the tubes 112 is provided with a circular opening 120 in its side wall near the end 114. The opening 120 is aligned with a corresponding small opening 122 in the fuel conduit 108. Preferably, the openings 122 are formed by any drilling process so that their dimension can be readily controlled according to the desired fuel flow and so that each opening 122 will be relatively uniform with respect to the other openings 122. At the same time, however, it has been recognized that this type of injector is significantly more tolerant of "sloppy" holes than conventional injectors.

As a result of this configuration, fuel from the conduit 108 will be injected through the openings 122 and 120 into the interior of each of the tubes 112. Compressed air passing through the tubes 112 and entering the liner 74 in a tangential direction will cause rapid evaporation of the fuel followed by combustion thereof within the liner 74. Because the path of movement of both fuel and combustion air within the liner 74 has a relatively high tangential component, the fuel and air remain in the liner 74 for a sufficiently long time as to promote both efficient vaporization and full combustion, notwithstanding the fact that the outer diameter of the liner 74 is less than six inches and the annulus height is one inch.

It should be noted that the fuel conduit 108 could be on either side of the tubes 112 if desired. However, it is preferable to locate the conduit 108 on the downstream side of the tubes 112 since there will be a lesser volume of air flowing within the annulus 82 at that location as a fair volume of the air entering the inlet 84 will be diverted from the annulus 82 into the tubes 112 themselves. Thus, at the downstream location, the conduit 108 will cause a lesser interference with the flow of air about the liner 74.

In this respect, because a fair degree of swirl in the annulus 82 is desired, the fuel line 34 may have a partially helical configuration to minimize interference with the swirling air as it emerges from the deswirl vanes 50.

The radially outer wall 76 of the liner 74 is also provided with a circumferential series of inwardly bent tabs 130. The tabs 130 are located between the tubes 112 and the end 86 and provide holes that serve to admit dilution air to the interior of the liner 74 from the annulus 82. As best seen in FIG. 6, each of the tabs 130 is formed by punching a U-shaped hole or slot 132 at the desired location in the outer wall 76 and then bending the tab inwardly to form an opening 134 as seen in FIG. 7. As can be seen in FIG. 2, the radially innermost end of each of the tabs 130 is directed toward the end 86 of the liner wall 76 so that the tabs 130 act as flow directors.

Returning to FIG. 3, the angular relationship of each of the tabs 130 with respect to individual blades 136 forming part of the turbine nozzle structure 46 can be seen. The individual nozzle blades 136 may have a conventional cross sectional shape and include a leading edge 138 and a trailing edge 140. As seen in FIG. 1, the leading edge 138 opens to the combustor 38 in relative adjacency to the tabs 130. The trailing edges 140 open to the turbine wheel blades 44.

As noted previously, swirl of compressed air in the annulus 82 is not suppressed, and is even encouraged in the exemplary embodiment of the invention. In a physical embodiment of the invention made according to the drawings forming part of this application, the air flow direction is about 40° from a line parallel to the axis of the turbine and, as viewed in FIG. 3, will be in the counter clockwise direction. According to the invention, there is a turbine nozzle blade 136 for each of the tabs 130 and thus the opening 134. In some instances, however, it may be desirable to provide two, three or more of the tabs 130 and openings 134 for each nozzle blade 136. In any event, the number of the tabs 130 and openings 134 will always be an integral multiple of one or more of the number of turbine nozzle blades 136.

Given the specific swirl angle mentioned above, the leading edge 138 of each of the blades 136 is located mid way between the centers of two adjacent ones of the tabs 130.

This in turn results in the incoming stream of air entering the interior of the liner 74 from the annulus 82 through each one of the openings 134 flowing generally in the direction of arrows 142 to impinge upon the leading edge 138 of a corresponding one of turbine nozzle blades 136. This stream of air will be, of course, relatively cool since it will not have appreciably mixed with the gasses of combustion formed within the combustor 38. This lack of appreciable mixing is due to the proximity of the openings 134 to the nozzle 46.

This arrangement locates each one of the turbine nozzle blades 136 in a cold spot which is relatively cooler than the average temperature of gasses flowing to the nozzle 46 and several hundred degrees cooler than the maximum temperature of such gasses. At the same time, the relatively hotter gas will be divided into a series of streams corresponding in number to the number of openings 134 and each will pass from the interior of the combustor between a corresponding pair of the turbine nozzle blades 136 as indicated by arrows 144. Thus, the relative hot spots in the total stream flow through the voids 146 between adjacent ones of the turbine nozzle blades 136. As a consequence, the temperature to which the turbine nozzle blades 136 are subjected during operation is a relatively lower temperature to provide an increased life for the turbine nozzle structure 46.

It should be kept in mind in considering this aspect of the invention that means other than the tabs 130 may provide for admission of compressed air from the annulus 82 into the interior of the combustor 38 just upstream of the turbine nozzle blades 136. Furthermore, the specific angular relationship between the tabs 130 and the turbine nozzle blades 136 as illustrated in FIG. 3 and described herein above is optimized for the particular degree of swirl employed in the invention. Where lesser degrees of swirl are utilized, the staggered relationship between the turbine nozzle blades 136 and the corresponding ones of the tabs 130 will be progressively de-emphasized to the point that where no swirl is occurring in the annulus 82, air admission openings in the form of the tabs 130 or otherwise will be more or less on the same radial line as the leading edge 138 of a corresponding one of the turbine nozzle blades 136.

From the foregoing, it will be appreciated that a combustor made according to the invention has a number of extraordinary features and/or provides a number of advantages. The use of high inlet air swirl allows the use of minimal deswirl vanes 50 to minimize cost. Furthermore, the high swirl promotes circumferential mixing of fuel and combustion air within the liner 74 while the high velocity from swirl provides for inexpensive convective cooling of the wall of the liner without the need for expensive cooling strips.

The addition of dilution air is achieved simply and inexpensively through the use of inexpensive punched out dilution air ports.

Fuel injection is achieved through inexpensive tangentially oriented tubes which act as atomizing air jets. Metering orifices for fuel are made reliable and uniform through the relatively inexpensive mediums of drilling.

The use of punched holes at strategic locations in the liner provides film-like cooling of the liner wall while the use of the spacers 94 permit both radial and axial thermal growth to occur without stressing components.

The described air flow patterns further allow an extremely small overall diameter and annulus height for the annular combustor. In this regard, it has been found that an annular combustor made according to the invention has achieved in engine testing a more than 30% increase in thermal loading over state of the art annular combustors (to $1776 \times 10^4$ BTU/ft$^3$ atm).

The efficient combustion achieved in a construction made according to the invention provides for a desirable smokeless exhaust and yet the combustor can be manufactured sufficiently economically as to have, if desired, a "throw away" capability. That is to say, the combustor may be used with cost effectiveness but once as, for example, in a gas turbine engine propelling a missile.

Thus, the invention provides an annular combustor that is both low cost and ideally suited for use in environments requiring a small envelope. As a consequence, it is ideally suited for use as part of a gas turbine engine employed in propelling relatively small missiles and may be used with efficacy in other environments as well.

Furthermore, the unique orientation of the dilution air admission openings in the form of the tabs 130 and openings 134 with respect to the turbine nozzle blades 136 assures that relative cool spots in the overall air stream pass over the nozzle blades 136 to cool them while the hot spots pass through the voids 146 between the blades 136. As a consequence, the nozzle blades 136, which are the critical life limiting component of the nozzle 46, have their life substantially increased and provide for a more reliable turbine. In addition, with the described structure, relatively high combustor pressure drops have been employed without a significant performance loss. In this regard, it is believed that the energy of the high velocity air streams shown by the arrows 142, which are aimed directly at the entrance to the turbine nozzle 46, is available and utilized to perform useful work upon impingement against the turbine wheel blades 44, rather than being lost in turbulent mixing within the combustor 38.

The structure produces still another advantage. In a physical embodiment made according to the drawings of the instant application, approximately half of the air flow through the combustor 38 is dilution air entering through the tabs 130. Because of the proximity of the tabs 130 to the inlet side of the turbine nozzle structure 46, and the high velocity of the air flowing through openings 134 defined by the tabs 130, combustion products are entrained and more easily negotiate the turn from generally axial flow to radial flow to raise turbine efficiency. This in turn allows the annulus defining the entrance to the turbine nozzle structure 46 to be relatively small, and thus, allows minimization of the overall diameter of the engine.

In addition, the high thermal loading mentioned above is achievable because of the unique orientation of the dilution air inlets in the form of the openings 134 with respect to the turbine nozzle blades 136. In particular, because this arrangement allows the blades 136 to operate at a lower temperature, more of the volume of the combustor 38 can be devoted to combustion and less of it to mixing with dilution air necessary to reduce average gas temperature so as to allow the turbine nozzle structure to have a reasonable useful life.

I claim:
1. A gas turbine comprising:
a bell-shaped housing defining an axis:
an annular liner having inner and outer annular walls within said housing and spaced therefrom to define a radially outer compressed air inlet between said housing and said liner, an axially elongated compressed air annulus between said housing and said outer wall and a radially extending compressed air annulus in fluid communication with said axially elongated annulus oppositely of said inlet, said liner further including a generally axially facing annular outlet between said walls and just radially inward of said inlet;
an annular turbine nozzle at said outlet and having a plurality of gas directing blades separated by voids defining gas passages;
a plurality of air inlets formed in said outer wall closely adjacent said outlet and establishing fluid communication between said axially elongated compressed air annulus and said outlet, the number of said plurality of air inlets being an integral multiple of the number of said plurality of blades, said air inlets further being angularly located with respect to respective ones of said blades such that cooling air stream(s) entering through the associated inlet(s) will flow across the respective blade to cool the same;
and a plurality of means for combusting fuel between said walls, the gasses of combustion generally entering said turbine nozzle at said voids between cooling air streams for adjacent blades

2. The turbine of claim 1 wherein said liner further includes a generally radial wall interconnecting said inner and outer walls opposite of said annular outlet.

3. The turbine of claim 1 wherein said outer and radial walls are stamped sheet metal and said air inlets are defined by punched tabs.

4. The turbine of claim 1 wherein said housing further includes a central sleeve within said inner wall to define a further axially elongated annulus in fluid communication with said radial annulus and opening just inside said annular outlet to provide for cooling of said inner wall and the introduction of additional cooling air at said annular outlet.

5. The turbine of claim 1 wherein said outer wall is formed of sheet metal and said air inlets are defined by a circumferential series of inwardly bent tabs directed toward said outlet to allow said cooling air streams to enter said liner near said outlet.

6. A gas turbine comprising:
a bell-shaped housing having an axis;
an axially extending sleeve within said housing;
an annular liner within said housing and about said sleeve, said liner having concentric inner and outer annular axially elongated walls respectively spaced from said sleeve and said housing, a radially extending end wall interconnecting said inner and outer walls at one end thereof, and an outlet at the other end of said inner and outer walls and opposite of said end wall;
a circular fuel manifold with angularly spaced fuel dispensing openings and disposed between said housing and said outer wall and located in a first plane transverse to said axis;
a plurality of open ended elongated tubes in said outer wall and adjacent said manifold, said tubes lying in a second plane parallel to said first plane and being directed generally tangential to the space between said inner and outer walls, one end of each tube being located in said space and the other end of each tube being located between said housing and said outer wall, there being one tube for each said, fuel dispensing opening;
means establishing fluid communication between each fuel dispensing opening and the interior of its associated tube;
an annular turbine nozzle structure located about said axis and in fluid communication with said outlet, said turbine nozzle structure having a plurality of turbine nozzle blades;
a turbine wheel mounted for rotation about said axis and having blades aligned with said turbine nozzle structure;
a plurality of gas inlet openings in said outer wall immediately adjacent said outlet, each said inlet having a flow director extending toward said outlet and arranged so as to direct air from between said housing and said outer wall toward an associated one of said turbine nozzle blades at the leading edge thereof to cool the same while allowing hot gasses of combustion from the combustion of fuel within said space to pass between the blades of said turbine nozzle structure.

7. The gas turbine of claim 6 where at least some of said air inlets and said flow directors are formed by tabs in said outer wall and directed radially inwardly and toward said outlet.

8. The gas turbine of claim 6 wherein said tabs are formed of bent sheet metal.

* * * * *